United States Patent [19]
Cowan

[11] Patent Number: 5,569,998
[45] Date of Patent: Oct. 29, 1996

[54] SOLAR POWERED PUMPING SYSTEM

[76] Inventor: Thomas Cowan, P.O. Box 956, Cutchogue, N.Y. 11935

[21] Appl. No.: 291,419

[22] Filed: Aug. 16, 1994

[51] Int. Cl.$^6$ ..................................................... H02J 1/00
[52] U.S. Cl. ............................ 320/21; 307/130; 323/299; 320/39; 320/40
[58] Field of Search ............................. 320/21, 39, 40, 320/15, 19; 323/282, 299, 303, 906; 363/56

[56] References Cited

U.S. PATENT DOCUMENTS

| | | | |
|---|---|---|---|
| 4,163,194 | 7/1979 | Ross | 324/29.5 |
| 4,281,278 | 7/1981 | Bilsky et al. | 320/13 |
| 4,626,764 | 12/1986 | Weinhardt | 320/9 |
| 4,636,931 | 1/1987 | Takahashi et al. | 363/71 |
| 4,644,256 | 2/1987 | Farias et al. | 323/299 |
| 4,649,334 | 3/1987 | Nakajima | 323/299 |
| 4,661,758 | 4/1987 | Whittaker | 320/21 |
| 4,742,291 | 5/1988 | Bobier et al. | 320/39 |
| 4,847,546 | 7/1989 | Bobier et al. | 320/21 |

Primary Examiner—Peter S. Wong
Assistant Examiner—Aditya Krishnan
Attorney, Agent, or Firm—Scully, Scott, Murphy & Presser

[57] ABSTRACT

A solar water pumping system for home use utilizing amorphous solar panels and circuitry for maintaining proper power to the system. Three reference voltages in combination with switching circuitry achieve this purpose by constantly monitoring input and output voltages and allowing a non-discontinuous switching between solar power and battery power.

4 Claims, 2 Drawing Sheets

SOLAR POWERED PUMPING SYSTEM

BACKGROUND OF THE INVENTION

1. Field of the Invention

The present invention relates to water pumping systems. More particularly, it relates to solar powered water pumping systems for home use.

Presently, water pump systems are used for a variety of different applications. Among these applications, are water pumps for garden ponds and fountains for home use. These water pumps are electrically driven and require either manual activation or a separate automatic timer means for activating the pump during the desired hours of operation. Thus, electricity must be expended in order to maintain the normal operation of the system.

2. The Prior Art

The patent to Farias et al., U.S. Pat. No. 4,664,256, discloses a liquid pumping system that is driven by solar energy. The invention utilizes circuitry that converts the solar energy into pulses of electric power. These pulses are then fed into an electro-mechanical pump, which is of a diaphragm type, and causes the pump to push out and pull in a liquid in one motion.

The patent to Nakajima, U.S. Pat. No. 4,649,334, discloses a method of and system for controlling a photovoltaic power system. The invention consists of a solar battery and a power converter for maintaining the battery voltage at a constant voltage reference. During operation, the voltage reference is periodically increased and decreased according to the direction of change of power and the voltage of the solar battery.

The prior art systems show the use of polycrystalline of solid crystal solar panels. The current output of these panels is significantly decreased during periods of diminished sunlight. For example, trees and other structures may prevent the sun from directly hitting the panels at some point during the day, thus lowering the output thereof.

SUMMARY OF THE INVENTION

In accordance with the invention, a solar water pumping system is provided which utilizes amorphous solar panels and custom circuitry to control and optimize the water pumping system.

It is therefore an object of the present invention to provide a water pumping system that overcomes the shortfalls of the prior art.

It is another object of the invention to provide a water pumping system that utilizes amorphous solar panels.

It is yet another object of the invention to provide a water pumping system that operates efficiently and reliably.

Yet a further object of the invention is to provide a water pumping system that utilizes three reference voltages to maintain proper power to the system.

BRIEF DESCRIPTION OF THE DRAWINGS

Other objects and features of the present invention will become apparent from the following detailed description considered in connection with the accompanying drawings which discloses two embodiments of the present invention. It should be understood, however, that the drawings is designed for the purpose of illustration only and not as a definition of the limits of the invention.

In the drawings, wherein similar reference characters denote similar elements throughout the several views.

DETAILED DESCRIPTION OF PREFERRED EMBODIMENT

Figure 1A:
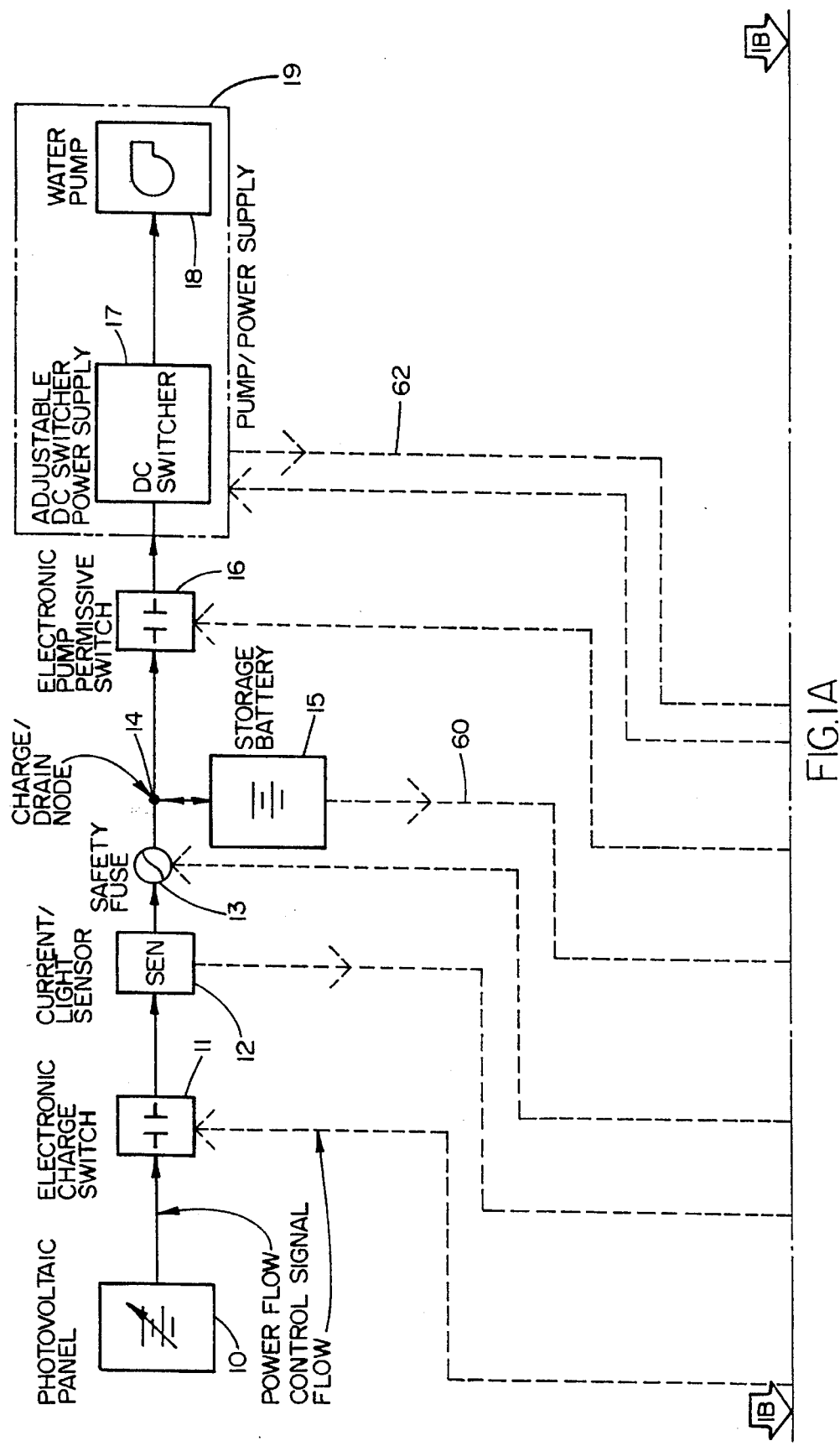
FIG. 1A is a schematic block diagram of the system of the invention.
Figure 1B:
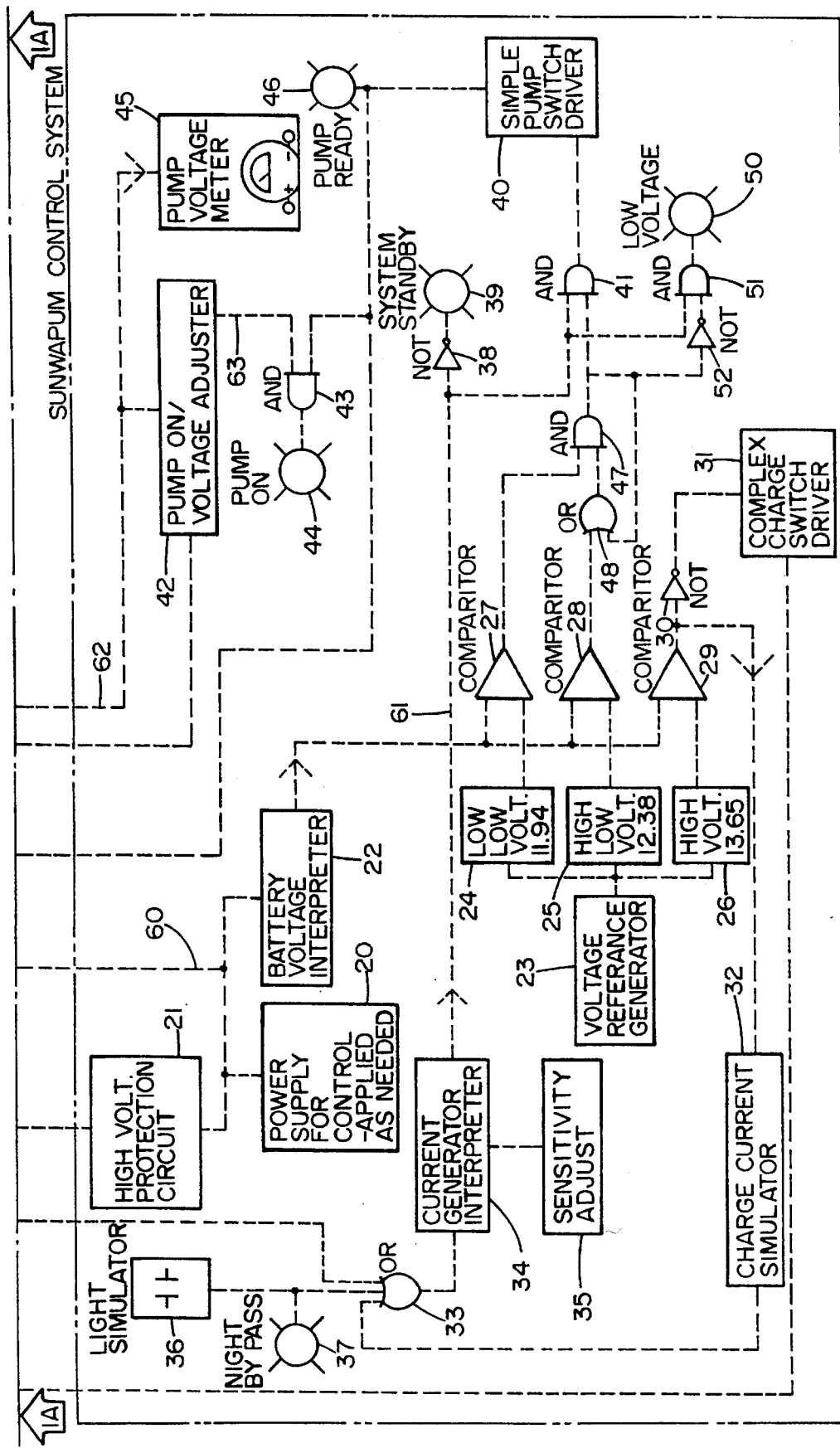
FIG. 1B is a schematic block diagram of the control system for the system of FIG. 1A.

With reference to FIG. 1A, the power for the system goes from the photovoltaic panel 10 all the way through to water pump 18 and in and out of battery 15. The photovoltaic panel 10 can range between 10 watts up to 50 or 60 watts, and the system is described as a 12 volt system. The photovoltaic panel 10 puts out energy, and it goes through an electric charge switch 11 that either lets the current go through or doesn't. The electronic charge switch 11 is something that has the possibility of going on and off very fast to actually limit the amount of current from the photovoltaic panels 10 to the storage battery 15. That is, electronic charge switch 11 will normally be closed, but when in a high voltage situation, it will go on and off to maintain a maximum voltage and thereby limit the current flow. A current/light sensor 12 is used to determine if the panel 10 is sensing light. Sensor 12 consists of schottky diodes. Because of its low voltage drop, sensor 12 can sense when the current is flowing through there, thereby indicating that the panel 10 is sensing light. In the alternative, a simple light sensor could be used, but the schottky diode sensor 12 serves to prevent back voltage leakage from the battery 15 and also affirms that the current is coming from the panel.

Next, the current flows to a safety fuse 13 and when needed, that fuse will open up and prevent the Photovoltaic panel 10 from overcharging the battery 15. After passing through safety fuse 13, the current flows to a charge/drain node 14. That is, a junction from the power into the system, power out of the system, and the storage battery. Node 14 acts as a non-discontinuous switch for the junction of the power into and out of the system and the storage battery. In one case, all of the power can technically be derived from the storage battery to the pump with only trivial amounts coming from the photovoltaic panels 10. In this case, all of the current supplied to the water pump 18 will come from the storage battery 15.

At some point during the day, the amount of energy the pump is using may be entirely coming from the photovoltaic panels 10 and therefore there will be no current flow from the battery 15. At another point during the day, one will actually have current flowing into battery 15 while the pump is still running, that is, in and out of charge/drain node 14. Storage battery 15 is preferably a lead acid/gel cel, but may be a battery of any suitable known type. The capacity of the battery used is closely linked to the system. For example, for a 10 watt photovoltaic panel, a 7 amp hour battery is good. In a 25 watt panel, a 14 amp hour is used. A 50 watt panel would use a 28 or 30 amp hour battery. That usually efficiently integrates the amount of light for a day and avoids overcharging the battery so it is cost-effective. Thus, you are getting the most out of the system.

The system is actually designed where the pump would be consuming about ⅓ the power, at peak sun, that the photovoltaic panels 10 are capable of providing. For example, for a 25 watt panel, the pump is usually set about ⅓ of that or 9 watts of energy consumption. This gives a convenient range and makes it a very consumer friendly product by pumping water most of the day on moderate cloudy days.

An electronic permissive switch 16, is the decision maker of the system. Switch 16 lets the pump run or not by turning power on and off into the DC switcher 17. Switcher 17 is a solid-state DC switch or power supply with adjustable output voltage. Switcher 17 takes the DC voltage, oscillates and drives it into an interim storage source, and that becomes the delivered voltage. In this case, with 12 to 13.5 DC volts in from the battery, the output would go from approximately 4 or 5 volts up to the full battery voltage. The low end of this voltage is due to the fact that inexpensive DC pumps don't really run well under 5 or 5½ volts, but you can technically turn it all the way down. Thus, DC switcher 17 takes 12 volts and delivers a lower voltage with the full current capability from the batteries to water pump 18. This enables the use of low cost brush type pumps.

In an alternative embodiment, brushless pumps could be used. When using brushless pumps, the DC switcher 17 and the pump 18 could be intimately tied together, thereby providing a much more durable system that is more costly. To make this change, the interconnection between switcher 17 and pump 18 would be replaced by a more sophisticated DC power supply that would drive a brushless DC pump or an AC pump in which case the switch power supply would take 12 volts DC and deliver some type of oscillating voltage to the pump. Thus, once you get the permissive signal from pump permissive switch 16, the energy consuming water pump 19 will be activated and pump the water.

Within the control system shown by FIG. 1A, the voltage 60 from the battery 15 first goes to power supply 20 which is necessary to power the control system. Thus, the control system is powered by the storage battery 15 itself. A high voltage protection circuit 21 constantly checks the battery voltage level, and if the voltage level approaches a "dangerous level," protection circuit 21 will blow fuse 13. A "dangerous level" would be something on the order of 14.5 or 15 volts. Protection circuit 21 is a standard consumer safety circuit to prevent the battery from rupturing if the voltage level is too high by detaching the photovoltaic panel 10 from the battery 15. The same battery voltage goes to a battery voltage interpreter 22. Battery Voltage Interpreter 22 sets up a voltage in the system that represents the battery voltage, such as, for example, one-tenth of the actual battery voltage. This is a technique used in other control systems.

For example, instead of just using the actual 10 volts, the Battery Voltage Interpreter 22 uses one-tenth of that and then that ¹⁄₁₀ represents what the battery voltage is, at a reduced level, and then the voltage is dealt with from a signal comparative range. The signal output from battery voltage interpreter 22 is then equally fed into three comparators, 27, 28 and 29.

A voltage reference generator 23 delivers three reference signals. Voltage reference generator 23 is similar to the battery voltage interpreter 22 in that it produces a reference voltage that is representative of the actual voltage. For example, low low voltage 24 which is 11.94 volts, would actually come out as 1.194 volts and then you can compare that voltage and determine whether it is higher or lower than the battery voltage. Voltage reference generator 23 generates three reference voltages 11.94, 12.38 and 13.65, as shown in blocks 24, 25, and 26, respectively. These values represent conceptual values that are relative and are actually accurate to a good system. These particular values are used to illustrate the system. Other values may be present, but they would just be slightly different than the ones represented. These values could also be adjustable within a particular range by the consumer. For example, the professional gardener might want to actually alter the setting voltages depending on the type of battery he has. The relativeness of these values generated by the voltage reference generator 23 are important.

The high voltage 13.65, shown by block 26, represents a recommended voltage from a lead acid/gel cell battery manufacturer. The first comparator 29 looks for the actual battery voltage from the battery voltage interpreter 22 versus this reference voltage, and then delivers a signal indicating whether you are below or above that voltage. If the actual battery voltage is below the reference voltage, comparator 29 puts out a signal saying "no I am not above your 13.65 volts," which is the desirable position. This signal is then inverted by NOT gate 30, reversing that and saying "yes" thereby safely allowing all the photovoltaic energy into the system. Once this occurs, charge switch driver 31 would pass that signal on to electronic charge switch 11 and close it. This is the normal state of the system, however, charge switch driver 31 can safely and continuously oscillate between an open and closed position and thereby limit the system input energy. When the system approaches high voltage, it doesn't want to go above the high voltage limit, and when it does, the comparator 29 puts out a YES signal, which generates a NO signal at the output of NOT gate 30, which in turn opens charge switch driver 31 causing charge switch 11 to open. When charge switch 11 opens, the battery voltage drops below the 13.65. The oscillation between opening and closing of charge switch 11 maintains the battery 15 at the proper constant voltage as the battery capacity approaches the upper limit.

Another technique used to limit the photovoltaic energy into the battery, instead of opening up the connection between them by an oscillating switch, is to move this switch directly across the photovoltaic panel and then short out its output. This technique does not damage the photovoltaic panel, also limits its output current to a battery, and would equally work in the above circuit.

When this oscillation state is reached, and the batteries are getting fully charged and the panel is putting out power and the pump is running, due to an interlock on this system that monitors the current going through the battery, a simulator 32 must be used. This is because you might sense a reduced current signal for node 14 if you start opening and closing charge switch 11 and thereby not know what the current situation is at this point. It can be fooled, because instantaneously there will be no current going through item 12. To prevent this situation, charge current simulator 32 is designed to sense when the comparator 29 is in that state of actually oscillating on and off or, charge current simulator 32 puts a dummy signal into OR gate 33 which is a three input OR gate, meaning any one of the three inputs will deliver a signal from current generator interpreter 34 saying "yes there is current from the sun, you are generating current from the PV panel." Thus, the output of current charge interpreter 34 is then basically saying that any one of the input conditions in OR gate 33 are present. The first input to OR gate 33 is from the current/light sensor 12 which senses current coming in from the photovoltaic panel 10. The second input to OR gate 33 is from current charge simulator 32 which provides a signal when the battery voltage is high to compensate for a false signal coming from the current/light sensor 12. Finally, OR gate 33 has a third input from the light simulator 36 which is a manual switch on the controller that simulates a light signal. The light simulator 36 is for night operation. For example, at night, if somebody wants to run the pump, it has to bypass the light interlock and therefore the user will just press a button which overrides the light interlock system. Thus, the name light simulator. Indicator 37 is just a light on the box saying "night bypass on". In other words, the pump is now going to run at night if other conditions are met, meaning there is energy in the system still available to do it.

A sensitivity adjuster 35 allows the adjustment of current generator interpreter 34 which is designed to have an effect only for the sensor part of the light. Adjuster 35 allows the user to set exactly whether they want the system on when the sun is just barely above or below the horizon both for morning and evening. To do this, the signal from current generator interpreter 34 goes to the invertor 38 when the sun goes down and lights up indicator 39 meaning that the system is in standby mode. Indicator light 39 just reminds you that the system has officially shut off and all of the other indicator lights don't matter. The output signal 61 from current generator interpreter 34 is also fed into an AND gate 41 which receives two signals. The first indicating light present and everything is okay to run by the light, and the second indicating that the battery situation is good and to go ahead and run the pump. The output of AND gate 41 is then fed into pump switch driver 40 which is a permissive switch. Pump switch driver 40 will illuminate ready light 46 indicating the system is ready to go, and then passes the signal to permissive pump switch 16 that provides power to switcher 17 allowing it to run. Switcher 17 is actually controlled by pump on/voltage adjuster 42 which is like a rheostat that allows the user to actually turn the pump on and off or set its voltage. Pump on/voltage adjuster 42 provides the control signal to DC switcher 17 indicating what it is to do (i.e., turn on or off). Coming back, DC switcher 17 sends a feedback signal to pump on/voltage adjuster 42 indicating what it is doing. The feedback signal 62 goes to pump volt meter 45 which indicates what DC switcher 17 is really set for and operating at.

AND gate 43 is an AND junction that receives a signal 63 from pump on/voltage adjuster 42 indicating that you want the pump to be on when the other system criteria are reached. When the pump goes on, indicator light 44 illuminates indicating pump activity. In other word, the pump ready light 46 illuminates when everything is permissive and the person can run the pump. When the pump 18 is actually on, indicator 44 illuminates reminding the user that the pump is on. In a normal mode of operation, the whole system would run unattended. In other words, the pump on switch would always be on and set at a certain voltage. When the sun comes up, the system senses the presence of it, checks to see if the battery is permissive (i.e., if there is enough energy there), and if so, the system goes on. The pump ready light 46 automatically comes on and the pump 18 would go on. If battery conditions drop down, you would actually lose the ready light 46, and you would lose the pump on light 44 too. When night comes, you lose the light, the pump ready light 46 goes off, the pump on goes off and the system standby light 39 illuminates.

The entire system operates automatically, but at any time the user can shut off the pump, in which case the battery would completely store up all the energy. For example, if one was going to run the pump at night a lot, one may shut it off during the day to build up energy stored in the battery.

Meter 45 lets the user know exactly what the pump voltage is and gives them some measure besides just looking at the amount of water flow. Meter 45 lets the user lower the energy usage of the pump 18 by lowering its voltage. If the user still sees the water flowing at an acceptable rate, but has got a lower voltage setting, they can directly assume they are using less energy and thereby creating a longer pump run time. Thus, meter 45 provides the user with an easy means to measure the power consumption of the system and regulate the water flow and duration thereof.

Generally, the way these systems are set up, is that each system, the 10, 25, and 50 watt, have a matched pump, each with a designed flow range that are designed to run from early in the morning, 7:00 or 8:00 am, right up until 8:00 p.m., almost dusk, on a moderately sunny day. On a full sunny day it would have a lot of reserve left over.

In another embodiment, meter 45 would be replaced by an LCD, liquid crystal display, that would also measure the current from the panels and to the pump, measure current in and out of the battery, and also measure the battery voltage. This would add to the consumers ability to control and understand the system. This allows the user to deal with concrete physical realities as opposed to just a narrow view of how much water is flowing.

Referring back to the comparator circuits, the system will fluctuate between items 46 and 50, the pump ready light and the low voltage light, respectively. Pump ready light 46 indicates the pump can run and the batteries are in acceptable condition. The low voltage light 50 indicates the system is locked out because the batteries are too low or too low in that it might hurt the batteries by further usage. Thus, one of those signals that is fed into AND gate 41 is actually coming from the comparators 24 or 25, and the other one is from the light source. These signals are necessary to run pump switch driver 40 which provides the ready to run signal.

Voltage reference generator 23 generates the high low voltage 25 which feeds one side of comparator 28. The actual battery voltage from battery voltage interpreter 22 feeds the other input to comparator 28. The output of comparator 28 is fed into an OR junction 48 which indicates either that the voltage level is o.k. and is ready, or you get a feed back from the front of the circuit indicating that the system is already on and the voltage level is high enough to maintain the system running. The feedback is from the output of AND gate 47, which combines the outputs of comparators 27 and 28. Thus, indicating that the system has already crossed that high low 25 of a 12.38 rating, and you are not below the low low voltage 24.

When the battery status is good (i.e., permissive to run the pump), the output of AND gate 47 is high which is fed into NOT gate 52. NOT gate 52 reverses the high signal, and therefor gives you a hi signal if the battery voltage is not ready. AND gate 51 summarizes both the daylight permissive and the potential low voltage status' of the battery, and therefore illuminates low voltage indicator 50 when the battery voltage drops below the desired level during the day.

The battery system works as follows. Once the system is above the high low voltage 25 (i.e., 12.4 volts), the system allows the system to run. Once the system is running, and if there is not enough sunlight to maintain the battery voltage within the required range, the system will begin to draw on the battery 15 and the voltage level of the battery 15 will start to decrease. The system will keep running until the voltage level drops below the low low voltage 24 (i.e, 11.94) and then at that point the pump system shuts down whatever usage you have. Once the system shuts down, the PV panels 10 will collect whatever light is available, and start charging battery 15 again. When the battery voltage reaches the high low voltage level 25 (i.e., 12.4 volts), the system will start the whole cycle again. If there is enough sun, the system just keeps the battery charged at its highest level, and doesn't shut off again. The purpose of the feedbacks and the OR and AND gates is to maintain the automatic operation depending on the current sunlight and battery levels.

The high voltage 26 (i.e., 13.65 volts) is a cutoff limit to prevent the battery 15 from overcharging. As the battery approaches its full capacity, the system charges battery 15 by a constant voltage technique which is one of the techniques recommended by the lead acid/gel cell manufacturers and is also used for regular lead acid batteries. The two other voltages, the low low voltage and the high low voltage serve three purposes.

The first is as follows: to run the system on a sunny day and have a high battery reserve. For example, a 25 watt photovoltaic panel can produce approximately a 1400 to 1800 milliamp output, and the pump is consuming 800 milliamps and the battery is a 12 amp hour battery. Assuming the system has been running all day, the batteries are well charged, and nightfall is approaching, the current output from the PVs 10 drops (for example) to 1200 and then 800, at which point the battery 15 just starts providing current to the system because the water pump is pulling 800 milliamps. This process continues towards the evening, so by the time it is dark, you are pulling 400 and then 600 milliamps from the battery 15. Now that the battery 15 is providing more current to the system than the photovoltaic panels, the battery voltage drops below its actual rest voltage or its reserve charge. So, at the low end, the low low voltage 24 will drop out at a point in the evening when the system is draining an awful lot of current, say 80%, from the battery to run that water pump 18. In this situation, the dropping difference between the actual rest voltage representing its reserve charge and the low voltage of the battery 15 is sizable so when it finally cuts out, you actually have a considerable reserve charge in the battery. This provides many benefits to the system. For one, you have gotten a whole days usage out of the system and the only reason you are now pulling the current out of the battery is because there is less sun at the latter part of the day.

Generally, the system is only supposed to run during the day for this mode of operation, and then if nightfall was approaching but you still had 200 milliamps coming from the PV panels 10, the system may shut off and then bounce back and run for maybe a half hour, and then shut off again. While it is off and the PV panel 10 is putting out 200 milliamps, the pump isn't consuming its 800 milliamps, and the 200 milliamps is being added to the battery and starts actually raising the battery voltage. This raises the actual charge in the battery so that when it kicks in again in this twilight area, you have got not only the 200 milliamp reserve still coming from the PV panel 10, but you have gained some charge in the battery, so you might run another full half hour and then it will finally shut off again. This is the first function of the low low 24 and high low 25 voltage controls for the system: it safely shuts off the system and keeps the batteries at a relatively high reserve level, like 60% reserve, which is a nice value in terms of battery usage life.

A similar cycle happens in the morning as the sun comes up fluctuating on and off a lot (from approximately 6 a.m.) as the sun is only moderately shining, and then eventually just stays on by about 8–9 a.m.

The second purpose that these dual voltages serve is to allow the system to extract additional energy from the batteries. On cloudy days, when the PV panel 10 might be putting out 400 or 500 milliamps, and the pump is still consuming 800, that means you are pulling 300 milliamps from the battery. Well, that is actually not that heavy a load on the 12 amp hour battery so if the prior day it was fully sunny and you had a 60% or 70% reserve in the batteries, and now it is cloudy that day and you are only pulling a couple of hundred milliamps from the batteries, the system might get a whole day of running on a pretty cloudy day because the current you are pulling from the battery doesn't drop the battery voltage to the low low voltage 24 mark. As a result, when you have finally hit the shut off voltage on these moderately cloudy days, or quasi-strong cloudy days, what really happened, is that you have actually drawn a larger amount of current from the reserve, causing the battery to have a lower rest voltage. This is because a moderate amount of current has been pulled from the battery consistently all day. So when the system finally cuts off, the battery capacity will be approximately 40% to 30% instead of the normal 60%, with the result being that the system has pumped water all day.

The third function that these dual voltages serve is to allow the system to pump water on extended cloudy days by continually integrating energy into power. When the sun comes up again, the battery voltage isn't going to lift up that high that quickly. The battery will have to absorb some of that energy to raise the battery capacity. Further, if the following day is cloudy, again, the system is not going to run constantly because you have just exhausted that reserve (i.e., the 60% to 30% reserve which you have used up.) Thus, the rest voltage of the battery is really low and you just don't have excess energy.

During these extended cloudy day periods, (2 or more) there is only a small amount of sun, say 400 milliamps worth going into a relatively drained 12 amp hour battery, for an 800 milliamp demand. Since the battery has a low rest voltage, it might take the sun a half hour or so to rise the battery to 12.40 volts and consequently turn on the pump. Once on, the pump will consume 800 milliamps; 400 milliamps will come from the sun and 400 milliamps from the battery. The battery voltage will proceed to drop, in this case at a bout the same rate that it rose, and after approximately a half hour, reach the cutoff voltage of 11.94 volts and turn off the pump. The cycle will then start over. This will go on indefinitely, all day, day after day as long as there is diminished sunlight. This is the third function of the dual voltages: tigh cycling of active photon energy, into stored potential chemical energy, and then releasing it into power by doing the work of pumping water. In other words, the pump system will pump water, even on the most cloudy of days, by pumping in spurts of work during the day, and thereby making use of all available sun energy.

Even if there is a blackened sky, and the photovoltaic output might be super low like 100 milliamps, such that the system is storing the energy into the battery for later use. If and when the sun should suddenly appear at any time in the above scenario, the system as designed automatically reorientates itself into the higher battery reserve mode.

It should be noted, that these three functions of the dual low low and high low control voltages is a natural orientation of the system dictated by the nature of the sun.

In the small 10 watt system, the panel would normally put out about 680 to 800 milliamps of current capability. The pump system is designed to run at about 400–500 milliamps and the PV panel is designed to output 600–800 milliamps, so there is a similar ratio of reserve, and the battery is a 7 amp hour battery. The large 50 watt system has a pump setting of about 1.7 amps, 1700 milliamps, and the photovoltaic panel will put out about 3.5 amps, 3500 milliamps, and the battery capacity is about 30 amp hours.

The small 10 watt system would pump 140 gallons per hour, at a 18" head, with a 400 milliamp load. The 25 watt system would pump 350 gallons per hour, at a 30" head, with a 700–750 milliamp load. The 50 watt system would pump 650 gallons per hour, at a 40" head, coming from the 1700 milliamp usage.

Nothing prevents the user from changing load dynamics and making adjustments that would increase head pressure and reduce flow, or vice versa, i.e., reduce head pressure to gain more flow. In addition, even though the systems have a design configuration, it is fully understood that to gain more sustained operation on cloudy days, one might add photovoltaic voltage through additional panels 10 and add battery voltage by adding another battery while keeping pump 18 the same. For example, change the 12 amp hour battery to 30 amp hour and the 25 watt panel to a 50 watt panel and still keep the moderate capacity of the pump of the 25 watt system.

While several embodiments of the present invention have been shown and described, it is to be understood that many changes and modifications may be made thereunto without departing from the spirit and scope of the invention as defined in the appended claims.

What is claimed is:

1. A solar powered pumping apparatus comprising:

amorphous solar panels for collecting solar energy from the sun and providing an output voltage and an output current;

a normally closed switch connected to said amorphous solar panels for conducting said output voltage and output current;

first means connected to said normally closed switch for sensing current flowing from said amorphous solar panels through said normally closed switch, said first means including second means for preventing reverse voltage to said amorphous solar panels;

a third means connected to said first means to limit voltage to a predetermined level from said amorphous solar panels;

a node means connected to said third means and said battery, said node means having output connections;

a battery connected to one of said output connections of said node means;

pump switch means connected to the other of said output connections of said node means; and fourth means connected to said first means, said third means, said battery and said pump means to control operation of said pump means by said amorphous solar panels and said battery, said fourth means comprising voltage generator means operably connected to comparator means and providing reference voltage levels for controlling condition of said first means and operation of said pump means.

2. The apparatus according to claim 1 wherein said fourth means comprises:

three voltage generator means for generating a first, a second and a third reference voltage;

a battery voltage interpreter;

a first comparator circuit within said comparator means receiving an input from said battery voltage interpreter and an input from one of said voltage generator means for generating a signal upon comparison of the input of said battery voltage interpreter and said first reference voltage, a second comparator circuit within said comparator means receiving an input from said battery voltage interpreter and an input from a second of said voltage generator means for generating a signal upon a comparison of the input of said battery voltage interpreter and said second reference voltage;

a third comparator circuit within said comparator means receiving an input from said battery voltage interpreter and an input from a third of said battery voltage generator means for generating a signal upon a comparison of the input of said battery voltage interpreter and said third reference voltage;

gate means receiving the output of said first comparator circuit, said second comparator circuit, and said third comparator circuit and controlling delivery of signals from said first comparator circuit in combination with the signals from said second comparator circuit for operation of said pump switch means; and means receiving the output of said third comparator circuit for operation of said first means.

3. The apparatus according to claim 2 and further comprising:

a pump means connected to said pump switch means;

adjustment means connected to said pump means for adjusting said fluid output of said pump;

a bypass switch means connected to said gate means for operating said pump means without current from said amorphous solar panels; and indicator means for displaying the pump condition, bypass condition, system standby condition and low voltage condition of the battery.

4. The apparatus according to claim 3, wherein said adjustment means comprises a voltage adjuster coupled to said pump, said voltage adjuster decreasing or increasing the voltage supply to said pump.

* * * * *